United States Patent
Vajracharya et al.

(10) Patent No.: US 7,246,076 B2
(45) Date of Patent: Jul. 17, 2007

(54) METHOD AND APPARATUS FOR QUEUE-BASED AUTOMATED STAFF SCHEDULING

(75) Inventors: Suvas Vajracharya, Mountain View, CA (US); David Setiawan, San Francisco, CA (US); Robby Tjahjono, San Bruno, CA (US)

(73) Assignee: Lightning Bolt Solutions, Inc., Burlingame, CA (US)

( * ) Notice: Subject to any disclaimer, the term of this patent is extended or adjusted under 35 U.S.C. 154(b) by 249 days.

(21) Appl. No.: 11/010,045

(22) Filed: Dec. 9, 2004

(65) Prior Publication Data
US 2005/0125278 A1  Jun. 9, 2005

Related U.S. Application Data

(60) Provisional application No. 60/528,107, filed on Dec. 9, 2003.

(51) Int. Cl.
  *G06F 9/46* (2006.01)
(52) U.S. Cl. ............................................... 705/9; 705/8
(58) Field of Classification Search ................... 705/8, 705/9
See application file for complete search history.

(56) References Cited

U.S. PATENT DOCUMENTS

| | | | |
|---|---|---|---|
| 5,270,920 A | * | 12/1993 | Pearse et al. .................. 705/8 |
| 5,737,728 A | * | 4/1998 | Sisley et al. ................... 705/8 |
| 5,907,829 A | * | 5/1999 | Kida .............................. 705/9 |
| 6,192,346 B1 | | 2/2001 | Green |
| 6,278,978 B1 | | 8/2001 | Andre |
| 6,345,260 B1 | * | 2/2002 | Cummings, Jr. et al. ....... 705/8 |
| 6,578,078 B1 | | 6/2003 | Smith et al. |
| 6,587,831 B1 | * | 7/2003 | O'Brien ........................ 705/8 |
| 7,080,025 B2 | * | 7/2006 | Mifune et al. ................. 705/9 |

FOREIGN PATENT DOCUMENTS

| | | | |
|---|---|---|---|
| WO | WO 9642062 | * | 12/1996 |
| WO | WO 9725682 | * | 7/1997 |
| WO | WO 01086481 | * | 11/2001 |

OTHER PUBLICATIONS

Donna et al "Scheduling personnel with an artificial intelligence program", Feb. 1989, Medical Laboratory Observer, v21, n2, p. 85(3), Dialog file 148, Accession No. 03880783.*

(Continued)

*Primary Examiner*—Romain Jeanty
(74) *Attorney, Agent, or Firm*—Michael A. Glenn; Glenn Patent Group

(57) ABSTRACT

A queue-based scheduling system, which comprises an automated staff scheduling computer program that is highly flexible in enforcing scheduling rules. This flexibility comes from the ability to: (1) Define conditional and unconditional rules; (2) Rank the rules/requests in varying priority as represented by a numeric value assigned to each rule/request; and (3) Specify rules both per individual and per group. These three abilities synergistically produce an automatic scheduling system that can enforce a wide variety of scheduling rules and requirements seen in actual staff scheduling situations. Furthermore, all these abilities rely on using a queue per scheduled assignment to hold requests and rules.

11 Claims, 4 Drawing Sheets

OTHER PUBLICATIONS

Kolesar "A Queuing-Linear Programming Approach to Scheduling Police Cars", Jul. 1974, The New York City-Rand Institute, New York, New York, pp. 1045-1061.*

Cres et al "Scheduling With Opting Out: Improving Upon Random Priority", Aug. 2001, Operations Research vol. 49, No. 4, pp. 565-577.*

Lewis et al "Staffing and Allocation of Workers in an Administrative Office", Apr. 1998, Management Science/vol. 44, pp. 548-570.*

Franklin "Desktop calendars", Jul. 1993, Macworld v10n7 pp. 104-109, Dialog file 15, Accession 00716467.*

Emmons et al (Off-Day Scheduling With Hierarchical Worker Categories), Jun. 1991, Operational Research vol. 39, No. 3.*

Weil et al (Constraint Programming for Nurse Schedule), Aug. 1995, IEEE Engineering in Medecine and Biology. pp. 417-422.*

Shaffer (A Rule-Based System for Automated Staff Scheduling, Dec. 1991, IEEE, pp. 1691-1696.*

Aykin "Optimal Shift Scheduling with Multiple Break Windows", Apr. 1996, Management Science vol. 42, pp. 591-602.*

Okada "A New Approach The Nurse Scheduling Program", 1988, IEEE, Expert System, pp. 1-2.*

\* cited by examiner

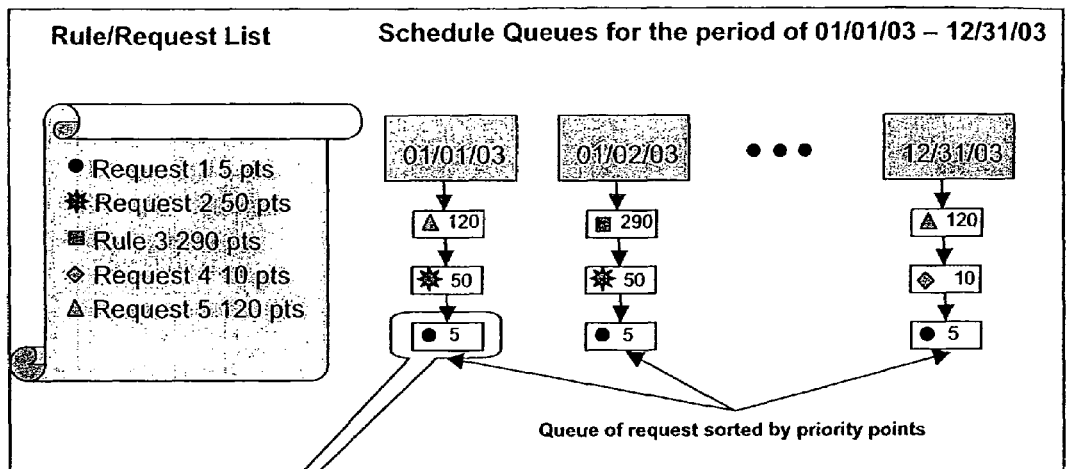

Figure 2

| Individual or Group: | Name of the individual or the group to whom the request applies. |
|---|---|
| Request Type: | Off – Do not schedule<br>On – Do schedule |
| Time Scope: | List of dates or a re-occurring date pattern.<br>Determines which queues this request will be inserted. |
| Assignment: | Task or shift in question. |
| Description: | A brief text describing this request. |
| Agent: | Specifies whether the user inserted this request or system inserted the request based on some conditional rules. |
| Priority Points: | Numerical value denoting its rank or weight relative to other requests/rules |

Figure 3

| Alternates for 11p - 7a on 8/19/2003 | | | | | | |
|---|---|---|---|---|---|---|
| Staff Name | 11p-7a | Weekday Nig... | Total Tally | Request | Points | Request Description |
| ✓ E. Kiebs | 4 | 4 | 29 | Neutral | 5 | JustInTime System Rule: Equalizer Settings |
| D. Bovet | 4 | 5 | 28 | Neutral | 5 | JustInTime System Rule: Equalizer Settings |
| ✓ J. Murray | 5 | 5 | 28 | Neutral | 5 | JustInTime System Rule: Equalizer Settings |
| ✓ J. Black | 5 | 5 | 30 | Neutral | 5 | JustInTime System Rule: Equalizer Settings |
| ✓ R. Roberts | 5 | 5 | 28 | Neutral | 5 | JustInTime System Rule: Equalizer Settings |
| ✓ P. Sharp | 5 | 5 | 30 | Neutral | 5 | JustInTime System Rule: Equalizer Settings |
| ✓ S. Cohen | 5 | 6 | 28 | Neutral | 5 | JustInTime System Rule: Equalizer Settings |
| S. Brenner | 5 | 6 | 29 | Neutral | 5 | JustInTime System Rule: Equalizer Settings |
| N. Jerne | 5 | 6 | 29 | Neutral | 5 | JustInTime System Rule: Equalizer Settings |
| ✓ E. Fischer | 5 | 6 | 29 | Neutral | 5 | JustInTime System Rule: Equalizer Settings |
| M. Brown | 5 | 6 | 29 | Neutral | 5 | JustInTime System Rule: Equalizer Settings |
| S. Tonegawa | 5 | 6 | 30 | Neutral | 5 | JustInTime System Rule: Equalizer Settings |
| R. Grant | 5 | 6 | 31 | Neutral | 5 | JustInTime System Rule: Equalizer Settings |
| ✓ R. Sperry | 6 | 6 | 30 | Neutral | 5 | JustInTime System Rule: Equalizer Settings |
| ✗ A. Gilman | 4 | 5 | 29 | Off | 1200 | No night shifts preceding 9a-6p shift [Caused by A. Gilman scheduled on 8/20/2003 for 9a - 6p ] |
| ✗ L. Hartwell | 5 | 5 | 29 | Off | 1200 | No morning shift a day after 3-11p shift [Caused by L. Hartwell scheduled on 8/20/2003 for 3p - 11p] |
| ✗ E. Lewis | 5 | 6 | 29 | Off | 1200 | No morning shift day after 6p-3a shift [Caused by E. Lewis scheduled on 8/20/2003 for 6p - 3a ] |
| ✗ H. Varmus | 5 | 6 | 30 | Off | 1200 | No night shift preceding a morning shift [Caused by H. Varmus scheduled on 8/20/2003 for 7a - 3p ] |
| ✗ G. Blobel | 4 | 5 | 27 | Off | MAX | Off Request for G. Blobel[Emergency Care] |

Double click on a staff member above to schedule the selected position on the calendar.

*Descriptions of rules along with the event that caused the request to be placed for this assignment*

Figure 5

METHOD AND APPARATUS FOR QUEUE-BASED AUTOMATED STAFF SCHEDULING

CROSS REFERENCE TO RELATED APPLICATIONS

This application claims priority to U.S. provisional patent application Ser. No. 60/528,107, which was filed on 9 Dec. 2003, and which is incorporated herein in its entirety by this reference thereto.

BACKGROUND OF THE INVENTION

1. Technical Field

This invention relates to automation of staff or employee scheduling. More particularly, the invention relates to a method and apparatus for queue-based automated staff scheduling.

2. Description of the Prior Art

Staff scheduling is the process of matching a list of employees with a list of shifts or assignments (hereafter referred to as "assignments") for a specified date range. The choice of a particular individual for a given assignment on a given day is generally subject to several constraints imposed by institutional scheduling policies and individual/group preferences. Scheduling a large task force in the presence of large number of such constraints, makes manual scheduling a daunting task. In many cases, it is infeasible to achieve a good schedule manually. Furthermore, the scheduling rules and preferences are rarely static. There are often exceptions to the scheduling rules and preferences based on various scheduling conditions. These problems also make it difficult to build a general purpose computer program that can automate employee scheduling.

The main challenges in automating the process are two-fold:

1. How are the constraints, e.g. rules and preferences, which are specific to the institutional, social, and political environment of an organization, expressed in a form that can be represented in the internal data structures of a general purpose software system? Furthermore, how can these representations be used to express not only rules and individual preferences, but also their exceptions?
2. Once a representation has been found, what is the computational process that makes it tractable to choose a schedule among large number of possible schedules, which grow exponentially as the number of employees or assignments increases?

It would be advantageous to provide a method and apparatus that addresses these problems.

SUMMARY OF THE INVENTION

The invention disclosed herein addresses the above-mentioned problems by introducing a queue-based scheduling system. The invention disclosed herein comprises an automated staff scheduling computer program that is highly flexible in enforcing scheduling rules. This flexibility comes from the ability to:

1. Define conditional and unconditional rules;
2. Rank the rules/requests in varying priority as represented by a numeric value assigned to each rule/request; and
3. Specify rules both per individual and per group.

These three abilities synergistically produce an automatic scheduling system that can enforce a wide variety of scheduling rules and requirements seen in actual staff scheduling situations. Furthermore, all these abilities rely on using a queue per scheduled assignment to hold requests and rules.

BRIEF DESCRIPTION OF THE DRAWINGS

FIG. 2 shows an internal queue data structure that is used to hold rules and requests entered by a user; in FIG. 2, time scope field of the requests, or actions of rules, are used to determine into which queues the request is inserted according to the invention;

FIG. 3 shows the details of a request as stored in computer memory according to the invention;

FIG. 5 shows how the invention can expose scheduling rationale by displaying the scheduling request on each individual and also the event that caused the request if it was imposed by a conditional rule.

DETAILED DESCRIPTION OF THE INVENTION

The invention disclosed herein provides a queue-based scheduling system, which comprises an automated staff scheduling computer program that is highly flexible in enforcing scheduling rules. This flexibility comes from the ability to:

1. Define conditional and unconditional rules;
2. Rank the rules/requests in varying priority as represented by a numeric value assigned to each rule/request; and
3. Specify rules both per individual and per group.

These three abilities synergistically produce an automatic scheduling system that can enforce a wide variety of scheduling rules and requirements seen in actual staff scheduling situations. Furthermore, all these abilities rely on using a queue per scheduled assignment to hold requests and rules.

The scheduling process using the said automated staff scheduling system can be summarized in the following steps:

1. Collect requests and rules using a graphical user-interface.
2. Determine the scheduling period that has a start date and stop date as defined by the user.
3. Create a request queue for each assignment of each day of the scheduling period.
4. For each request or a rule, determine which days the request or rule is applicable.
5. For each applicable assignment of each day, insert the request into its queue.
6. Sort the assignments of all days from most constrained to least constrained and begin scheduling from the most constrained assignment.
7. For each assignment in the day, create a list of candidates for that assignment for that day. For each candidate, associate the highest priority request in the request queue that applies to that candidate. This highest priority value for the candidate is the candidate bid for the chosen assignment.
8. Sort the candidate according to the bid calculated in Step 7 above. Schedule the candidate with the highest number.
9. Repeat Steps 6-9 above for the remaining assignments in each day of the user-defined period.

Figure 1:
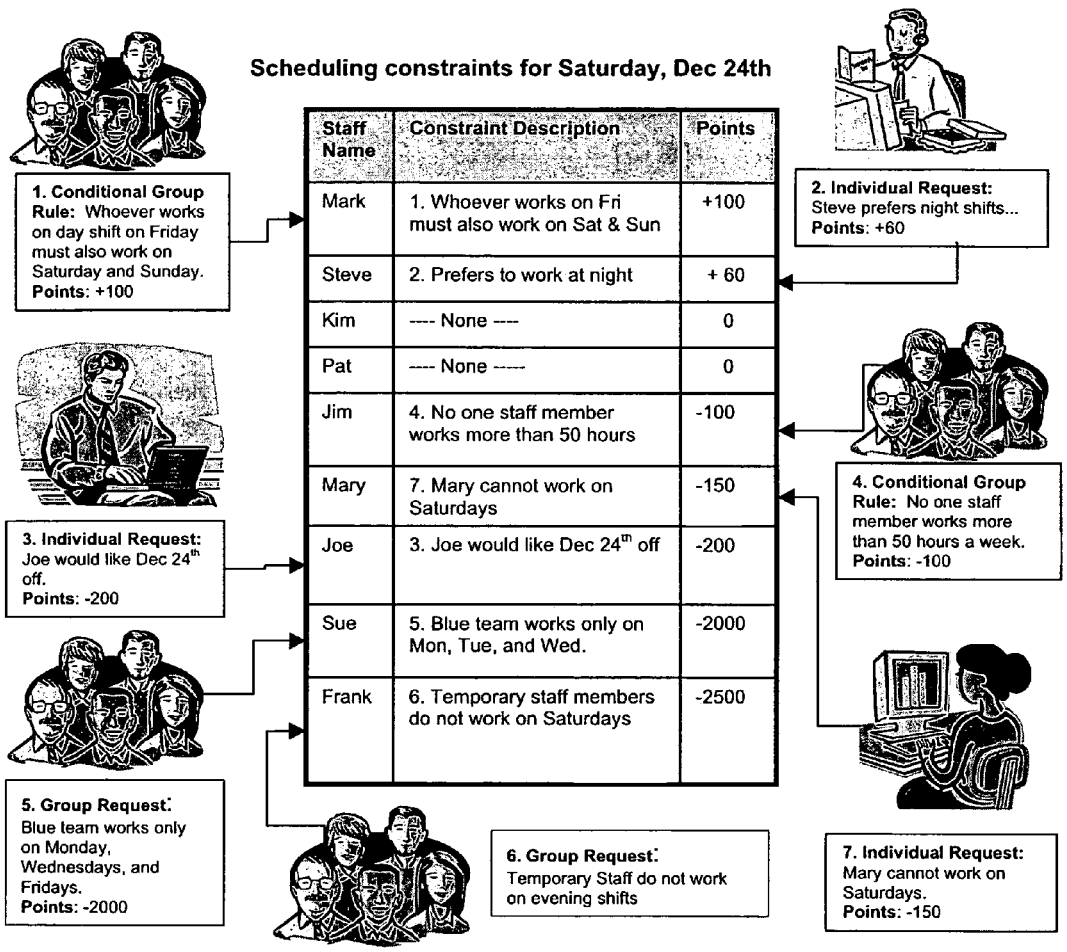
FIG. 1 provides an example of constraints that go into scheduling an assignment on a given day according to the invention.

As a concrete example of the main ideas above, FIG. 1 shows how scheduling rules and individual preferences are collected in a queue in a single day, i.e. December 24th. For simplicity, it is assumed in the figure that there is only a single assignment in each day, although the same method can be used for cases where there are multiple assignments in a day.

Constraints on scheduling choices can be either conditional, meaning the constraints are only in effect if a certain scheduling condition applies, or they are unconditional. An example of a conditional rule is: "If George is scheduled for Primary assignment, then do not schedule Steve for the Backup assignment the same day." Whether a rule is conditional or unconditional, any rule can be defined to either apply to a specific individual or a group of individuals. An example of a group rule is: "Do not exceed 40 hours for the full-time staff members." Users can define as many groups as needed, in addition to a system defined group called "Everyone" which includes all scheduled individuals. Institutional rules are generally expressed in the form of group rules because institutional rules are not specific to any one individual.

As shown in FIG. 1, all rules and requests are associated with a number which describes the rank or the priority of that rule/request relative to the other rules. A large positive number indicates that any individual under that rule is highly favored to be scheduled for the given shift on the given day. In contrast, a large negative number implies that all individuals subject to the rule are not favored to be scheduled. Individuals who are not subject to any rules have a priority point zero by default, indicating neutrality. Given this scheme, the choice of who to schedule on a given shift is determined by sorting the list and selecting the individual with the highest positive point value. Consequently, when an individual is under more than one rule, the rule having the highest absolute value of priority points is the rule chosen to allow the individual to compete with other individuals. This has important implication because it lends to a straightforward way of implementing exceptions to rules. For example in the FIG. 1, assume that Joe worked on Friday instead of Mark. Because of the rule "Whoever works on Friday works on Saturday and Sunday," Joe is under this constraint to be scheduled for Saturday with priority points of +100. However—because Joe is under a constraint, "Joe would like December $24^{th}$ off" with a point value of −200 and because the absolute value of this request is greater than the rule described above—Joe is not scheduled for Saturday. Therefore the two rules interact to form a more complex rule which has the meaning: "Schedule Joe on Saturday and Sunday if Joe is working on Friday unless Joe has requested that day off."

FIG. 2 shows how the requests and rule descriptions are stored in queues per assignment per day for a user-defined period. Static or unconditional rules can be entered in the request queues prior to running the automated scheduler. Although the word "queue" is used to refer to a memory data structure that holds the collection of requests, any equivalent data structure, such as an array or a list, could be used instead.

Conditional rules and requests are entered during the execution of the program, depending on the scheduling conditions. For example, in the conditional rule "If George is scheduled for Primary assignment, then do not schedule Steve for Backup assignment on the same day," the request "Do not schedule Steve for Backup" is only entered in the request queue for "Backup" that day only if the auto scheduler has already scheduled George for "Primary" that day. As a result, the queues may grow during the execution of the program. The significance of dynamically manipulating the request queues during the execution of the program is that every scheduling decision can influence the scheduling decisions of another assignment which has not yet been scheduled. This permits a highly adaptive scheduler that changes its scheduling behavior during the execution of the program, based on scheduling decisions made earlier during execution of the program.

FIG. 3 shows how the request information can be summarized as appropriate for storage in the internal data structures, or as stored in the computer's memory. The agent is either the user who manually entered the request on the computer, or a consequence of a conditional rule described next. The time scope determines in which queues of FIG. 2 the request should stored.

Figure 4:
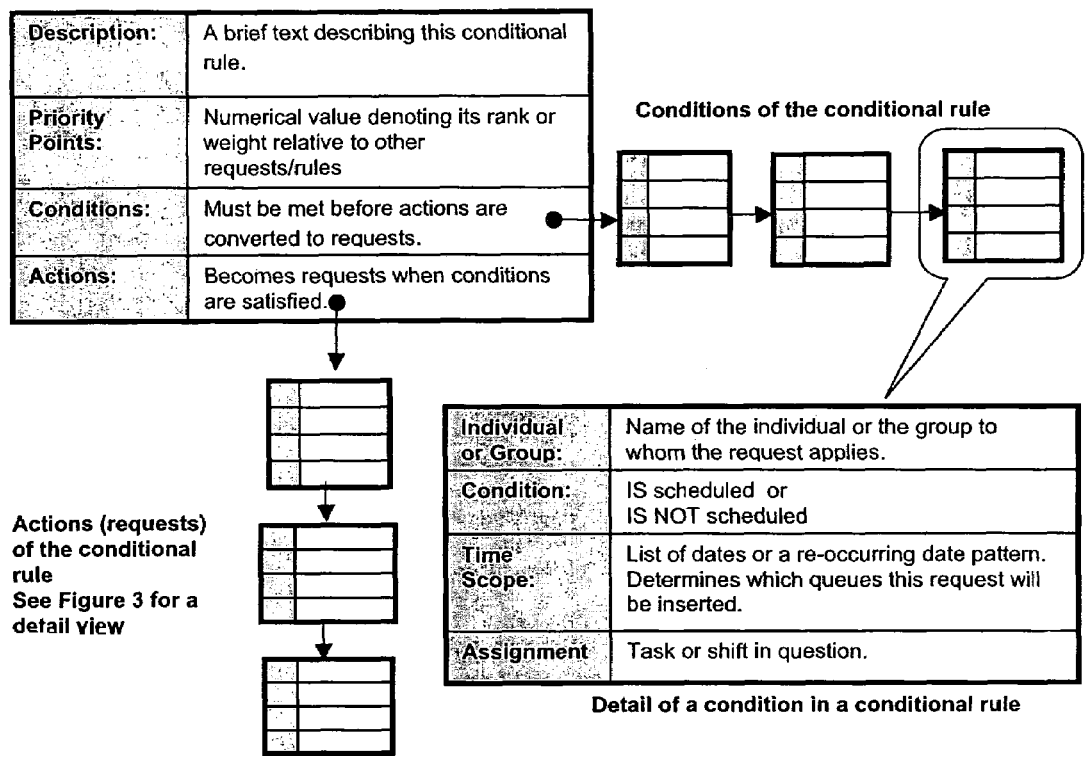
FIG. 4 shows the details of a conditional rule as stored in computer memory according to the invention.

FIG. 4 shows the details of a conditional rule. Each conditional rule has a set of conditions and a set of actions. When all the conditions are met, the set of actions is converted into a request of the form shown in FIG. 3 before they are inserted into appropriate queues of FIG. 2. Consider the complex conditional rule "If Sam is scheduled on Friday for Phones and Mary is not scheduled 2 days later for Admin, then schedule Frank the following Tuesday for Phones and schedule Mary on December $20^{th}$ through December $21^{st}$" for Late Shift. In this somewhat concocted example:

1. The conditions are "Sam is scheduled on Friday for Phones" and "Mary is not scheduled 2 days later."
2. The actions are "Schedule Frank the following Tuesday for Phones" and "Schedule Mary on December 20th through December $21^{st}$."
3. "Following Tuesday," "Friday," "2 days later," "December $20^{th}$ through December 21 $^{st}$" are examples of time scopes used in the rule.
4. Phones, Late Shift and Admin are examples of assignments.

Having the requests stored in the queues enables the auto scheduler to readily offer a justification or rationale for a scheduling decision made by the scheduling system. This explanation or rationale can be used by the human user to override the automated scheduling choices if necessary. FIG. 5 shows an interface that exposes information contained in the queues in a form a user can use to override the choice that the automatic scheduler has made. This alternates list displays all the constraints (requests) that are currently imposed on the alternate individuals. The column called "Request" indicates whether there was a request for "On," "Off," or "Neutral" if no requests are applicable. The "Request Description" column is the name of the request or the rule that created the request. Some entries also show the cause in the request description. These are requests that are actions of conditional rules, and the information about the causing event is derived from the "Agent" field of FIG. 3.

The above describes how to decide who to schedule for a given assignment on a given day. This is a local decision because it does not consider the impact it has on the entire schedule. A collection of good local choices, however, can lead to poor global schedule because of interdependencies between assignments caused by rules. In other words, a perfectly good local choice may force a poor local choice on a different assignment on a different day by driving the auto scheduler into a corner towards the end of scheduling process. When that happens, the auto scheduler may be forced to schedule someone that violates a rule or a request. The following describes two methods to avoid these cases.

In the first method, the auto scheduler generates schedules in multiple phases. During each phase, the automatic scheduler entirely schedules every assignment on every day in the scheduling period. On second and later phases, it learns from any hazards detected in earlier phases to generate a better overall schedule. These hazards are detected whenever the automatic scheduler cannot find an individual that would not violate some rule or request. Whenever the automatic scheduler is forced into such a corner, it looks to see if any conditional rule has forced this situation. If it did, it finds the source or the condition of the rule (the cause) that generated the violating request (the result). Note that the automatic scheduler cannot do anything about violations that result from a static or unconditional request because the cause of those requests is human users. For dynamically generated requests, such as those caused by conditional rules, the auto scheduler can make a note to itself in the current phase not to make the scheduling choice that it had made on the source or causing assignment. This self-note can be achieved by entering a normal on/off request on the source queue, as described in FIGS. 2 and 3. The only difference is that these are requests made internally by the auto scheduler and are not directly related to rules and requests entered by the user. In subsequent phases, the automatic scheduler avoids the hazard by using the submitted request, i.e. the self-note, from previous phases. To take this internal request into account, the auto scheduler need not do anything special. The auto scheduler sorts the queue and chooses the highest priority candidate, as discussed earlier. This internal request can be thought of as a way to push-back the scheduling choice that forced the violation to occur. After several iterations (phases), the hazards can be avoided.

In the second method, the auto scheduler randomly chooses different assignments on different days, rescheduling individuals until the global schedule improves or converges to an acceptable one. To know whether the global schedule has improved after a scheduling adjustment, the auto scheduler summarizes the number of requests or rules in each queue that are in violation across all assignments in the entire schedule.

If the total number of violations decreases, the schedule has been improved and therefore is chosen over prior schedules. This method, known in academic literature as "Simulated-annealing", works well when used together with the described queue-based scheduler.

One of the desirable consequences of priority-based scheduling system using queues is that it allows a straightforward implementation of an auction system as a way to resolve conflicting requests for contested assignments or days. Each scheduled individual can be given a fixed number of points or currency to spend. Each individual then decides how to distribute or spend the points to various requests, based on that individual's needs and preferences. In many cases where there are no contentions, a small number of points may suffice, but in other cases, such as an off request for a popular holiday, may require raising the points to out-compete others with similar requests. The individual that spends the most points wins the request for that assignment for that day. It is also easy to model seniority or preferential treatment of individuals by giving each individual a different number of points to spend. A senior staff member, for example, could be given 20,000 points to make the requests and preferences of his choice and a junior member could be given 15,000 points. Points that remain unspent during a scheduling period could be carried over to the next scheduling period, attenuated gradually, or cancelled.

OPERATION

1. The scheduling administrator defines scheduling rules and policies and enters them in the system in the form of conditional or unconditional rules. Each rule is given a number that represents the priority of that rule.
2. Users, potentially using a web interface from a remote location, enter their request for the scheduling period. These could be either re-occurring request, e.g. "I prefer to work on Tuesdays," "I prefer to not work the first Monday of every month," or non-reoccurring, e.g. "I would like December $24^{th}$-December $26^{th}$ off." Users can assign a priority point to each of these requests, indicating the relative importance of the request.
3. Once all rules and requests have been entered, the scheduling administrator tells the system to begin scheduling for a user-specified period defined by a begin date and an end date. The auto scheduler sorts the rules/requests for a given assignment for that day based on the value of the priorities. Candidates are matched with the requests to arrive at the candidate with the highest request priority, which is the scheduling choice for the assignment for that day.
4. Once the schedule has been generated by the system, the scheduling administrator optionally inspects each scheduling choice and reviews alternates for any particular assignment. The auto scheduler helps the administrator in choosing alternates by showing all the rules and requests that are in effect for each of the alternates. This information is available in the request queue for the chosen assignment.
5. When the schedule is completed after manual modifications in Step 4 above, the schedule can then be made available for all to see either by printing the schedule on a printer or making the scheduling available on a web site for remote viewing.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A queue-based scheduling apparatus for automated staff scheduling and for enforcing scheduling rules and requirements, comprising:
    means for defining conditional and unconditional rules;
    means for ranking rules and requests in varying priority as represented by a numeric value assigned to each rule and request; and
    means for specifying rules both per individual and per group; and
    means for generating schedules in multiple phases;
    wherein during each phase, an automatic scheduler entirely schedules every assignment on every day in a scheduling period;
    wherein on second and later phases, said auto scheduler learns from any hazards detected in earlier phases to generate a better overall schedule;
    wherein said hazards are detected whenever said automatic scheduler cannot find an individual that would not violate some rule or request;
    said automatic scheduler determining if any conditional rule has caused detection of hazard, and if said conditional rule is satisfied, finding a source or a condition of the rule that generated a violating request;

said automatic scheduler generating and submitting an internal request; and in subsequent phases, said automatic scheduler avoiding said hazard by using said submitted request from previous phases.

2. The apparatus of claim 1, further comprising:
at least one queue per each scheduled assignment for holding requests and rules.

3. A scheduling process, comprising the steps of:
collecting requests and rules using a graphical user-interface;
determining a scheduling period that has a user-defined start date and stop date;
creating a request queue for each day of a period;
for each request or rule, determining which days said request or rule is applicable;
for each applicable day, inserting a request into its queue;
sorting said days from most constrained to least constrained;
beginning scheduling from a most constrained day;
for each assignment in a day, creating a list of candidates for that assignment for that day;
for each candidate, associating a highest priority request in said request queue that applies to said candidate, wherein said highest priority value for a candidate is a candidate bid for a chosen assignment;
sorting said candidates according to a bid calculated in the immediately preceding step;
scheduling a candidate having a highest number;
determining a schedule for any remaining days; and
means for generating schedules in multiple phases;
wherein during each phase, an automatic scheduler entirely schedules every assignment on every day in a scheduling period;
wherein on second and later phases, said automatic scheduler learns from any hazards detected in earlier phases to generate a better overall schedule;
wherein said hazards are detected whenever said automatic scheduler cannot find an individual that would not violate some rule or request;
said automatic scheduler determining if any conditional rule has caused detection of hazard, and said conditional rule is satisfied, finding a source or a condition of the rule that generated a violating request;
said automatic scheduler generating and submitting an internal request; and in
subsequent phases, said automatic scheduler avoiding said hazard by using said submitted request from previous phases.

4. The method of claim 3, wherein said constraints on scheduling choices comprise either of conditional and unconditional constraints, wherein conditional constraints are only in effect if a certain scheduling condition applies.

5. The method of claim 3, wherein a rule applies to either of a specific individual or a group of individuals.

6. The method of claim 3, further comprising the step of:
associating rules with a number which describes a rank or a priority of that rule relative to other rules;
wherein a large positive number indicates that any individual under that rule is highly favored to be scheduled for the given shift on a given day;
wherein a large negative number indicates that any individual under that rule is not favored to be scheduled for the given shift on a given day; and
wherein an individual who is not subject to any rules has a priority point zero by default, indicating neutrality.

7. The method of claim 3, further comprising the step of:
choosing a rule having a highest absolute value of priority points for an individual to compete with other individuals when more than one rule is to be applied.

8. The method of claim 3, further comprising the steps of:
entering static or unconditional rules in the request queue prior to running the automated scheduler; and
entering conditional rules and requests during execution of the steps of said method, depending on the scheduling conditions;
wherein a highly adaptive scheduler is provided that changes its scheduling behavior during execution of the method, based on scheduling decisions made during execution of the method.

9. The method of claim 3, further comprising the step of:
providing conditional rules, wherein each conditional rule has a set of conditions and a set of actions, wherein when all conditions are met, said set of actions is converted into a request.

10. The method of claim 3, further comprising the step of:
providing an alternates list that exposes information in a form a user can use to override the choice that said automatic scheduler has made; wherein said alternates list displays all constraints and requests that are currently imposed on alternate individuals.

11. The method of claim 3, further comprising the steps of: said auto scheduler randomly choosing different assignments on different days, rescheduling individuals until a global schedule improves or converges to an acceptable one; and said auto scheduler summarizing a number of requests or rules in each queue that are in violation across all assignments in an entire schedule to determine whether a global schedule has improved after a scheduling adjustment; wherein if a total number of violations decreases, said schedule has been improved and therefore is chosen over prior schedules.

* * * * *